United States Patent [19]

Candore

[11] Patent Number: 5,358,591
[45] Date of Patent: Oct. 25, 1994

[54] METHOD OF AND APPARATUS FOR COVER SHEET REMOVAL FROM LAMINATED BOARDS

[75] Inventor: Amedeo Candore, Bodio Lomnago, Italy

[73] Assignee: Morton International S.p.A., Mozzate, Italy

[21] Appl. No.: 147,803

[22] Filed: Nov. 4, 1993

[30] Foreign Application Priority Data

Feb. 3, 1993 [IT] Italy .................... RM93A 000057

[51] Int. Cl.5 ............................................. B32B 31/18
[52] U.S. Cl. ..................................... 156/344; 156/584; 430/256
[58] Field of Search ................. 156/344, 584; 430/256, 430/258

[56] References Cited

U.S. PATENT DOCUMENTS

| | | | |
|---|---|---|---|
| 4,183,751 | 1/1980 | Matsumoto et al. | 156/344 X |
| 4,631,110 | 12/1986 | Tsumura et al. | 156/344 X |
| 4,724,032 | 2/1988 | Kay | 156/344 |
| 4,867,836 | 9/1989 | Hamamura et al. | 156/344 X |
| 4,961,817 | 10/1990 | Seki | 156/344 X |
| 5,110,393 | 5/1992 | Sumi et al. | 156/344 |

FOREIGN PATENT DOCUMENTS

2-250057 10/1990 Japan .................... 156/584

*Primary Examiner*—Mark Osele
*Attorney, Agent, or Firm*—Gerald K. White

[57] ABSTRACT

Featured for removing the cover sheet from a dry film laminated on a board is the combination of a knurling wheel action and an air blowing injector which work together in a single stroke to separate the cover sheet from the edge of the dry film, with which combination a sucking roll is provided in cooperative relation, and which, upon touching the surface of the board, starts to rotate whereby the cover sheet, already separated in an area thereof from the dry film, is sucked and peeled from the dry film by the sucking roll and with continued rotation of the sucking roll is removed in its entirety from the dry film.

13 Claims, 6 Drawing Sheets

METHOD OF AND APPARATUS FOR COVER SHEET REMOVAL FROM LAMINATED BOARDS

BACKGROUND OF THE INVENTION

1. Field of the Invention

This present invention relates to an improved method of and apparatus for effecting cover sheet removal from dry-film laminated boards. The invention has particular utility in the application and processing of dry films in an in-line system for fabricating printed circuit boards.

2. Description of the Related Art

In the fabrication of printed circuits, a solder mask, typically formed from a layer of photoimageable composition, is applied to one or both surfaces of the printed circuit board. The photoimageable layer, comprised of a photoresist substance, is exposed to actinic radiation which is patterned by means of a template or artwork. Subsequent to such exposure, the photoimageable layer is developed in an organic solvent or aqueous solution which washes away either exposed or unexposed portions of the layer (depending upon whether the photoimageable material is positive acting or negative acting). The portion of the layer which remains on the surface is then cured, with heat and/or UV light, for example, to form a hard, permanent solder mask that is intended to protect the printed circuit for the life of the board.

One prior art method known in the art for applying the layer of photoimageable composition to the printed circuit board surface is to apply the material in liquid form, and then, either allow it to dry or partially cure the material to form a semi-stable layer.

There are a number of advantages to applying a photoimageable layer to a printed circuit board as a dry film rather than as a liquid. In particular, dry films are free of organic solvent and therefore eliminate this hazard from the workplace and eliminate the need for apparatus to protect the immediate work environment and the more general environment from organic solvent emissions.

Typically, a dry film comprises a cover sheet of support material which is somewhat flexible but which has sufficient rigidity to provide structure to a layer of photoimageable composition which overlies one surface of the cover sheet. The cover sheet may be formed of polyester material, such as polyethylene terephthalate (PET), such as that sold as MELINEX ® by Imperial Chemical Industries Limited.

To protect the photoimageable layer and to enable the dry film to be rolled, it is conventional for the exposed surface of the photoimageable layer to be covered with a removable protective sheet, e.g., a sheet of polyethylene. An example of such a dry film is sold as LAMINAR DM ® by Morton International, Inc., the assignee of the present invention.

The method of use of such prior art dry film is generally as follows. The protective polyethylene sheet is removed from the photoimageable composition layer immediately prior to application of the dry film to the surface of the printed circuit board. This may be accomplished, for example, using automated apparatus which peels away and rolls up the protective sheet as the dry film is unrolled from a reel. The dry film is applied to the surface of the circuit board with the photoimageable layer in direct contact with the board surface. Using heat, vacuum and mechanical pressure, the photoimageable layer is immediately laminated to the surface of the board.

The PET cover sheet remains overlying the photoimageable layer, protecting the photoimageable layer from exposure to oxygen and from handling damage. The cover sheet also permits a pattern, or template, to be laid directly on top of the dry film for contact printing, if contact printing is to be used (as is usually preferred from the standpoint of obtaining optimal image resolution). The dry film is exposed to patterned actinic radiation through the PET cover sheet.

The PET cover sheet is then removed, permitting access to the exposed photoimageable layer by developer. Depending upon the composition of the photoimageable layer, the photoimageable layer is developed with organic solvent, aqueous developer, or semi-aqueous developer. By semi-aqueous developer is meant herein a developer which is about 90% or more by volume aqueous solution with the balance being an organic solvent such as 2-butoxy ethanol and other glycol ethers. The photoimageable layer may either be positive acting, in which case the exposed portions are removed by developer, or negative acting, in which case the unexposed portions are removed by developer. Most photoimageable layers for preparing solder masks are negative acting. Most photoimageable composition layers require some cure subsequent to development to render the layer hard and permanent so as to serve as a solder mask. Depending upon the composition of the photoimageable layer, curing may be effected with heat and/or UV light.

Printed circuit boards almost invariably have uneven surfaces in which circuitry traces are raised or elevated over the surface of a board of electrically non-conducting material. Circuitry traces may be the residual portions of an etched metal layer or may be built up from the board surface. It is desirable for a solder mask, particularly one formed from a photoimageable composition, to conform to the contours of a circuit board surface. A conforming solder mask which adequately covers both the board surface and the upstanding traces minimizes the use of expensive photoimageable composition.

Processes for applying conforming solder mask on a surface having raised areas such as circuit traces on a printed circuit board are disclosed in U.S. Pat. Nos. 4,889,790 Leo Roos et al. and 4,992,354 F. J. Axon et al., which patents are assigned to the assignee of the present invention. The disclosures thereof, by reference, are incorporated herein.

The processes disclosed in these patents and application involve applying a solder mask-forming photoimageable composition layer to a printed circuit board using a dry film in which an intermediate layer is interposed between a support film or cover sheet and the photoimageable layer. The intermediate layer of the dry film is selectively more adherent to the photoimageable composition layer than to the cover sheet, allowing or facilitating the removal of the cover sheet after the photoimageable layer is applied to a printed circuit board with the intermediate layer remaining on the photoimageable composition layer as a "top coat." The top coat is of non-tacky material and can be placed in contact with other surfaces, such as artwork for contact printing. The top coat also serves as an oxygen barrier, allowing the photoimageable composition layer to remain unexposed on the printed circuit board, after cover sheet removal, for some length of time.

The use of dry film having the "intermediate layer" or "top coat" make possible the processes described in the aforementioned patents. In each case there is provided a conforming step, e.g., conforming vacuum lamination, after removal of the cover sheet. Because the cover sheet is removed prior to the conforming step, better conformance, particularly when applying thin photoimageable composition layers onto boards with closely spaced traces, is achieved. Better resolution is also achievable because the top coat may be directly contacted with artwork for contact printing and because the top coat is much thinner than a cover sheet or support film and is, therefore, much less a deterrent to good resolution than a cover sheet.

To form a solder mask, the protective polyethylene sheet is first peeled away from the dry film and the exposed surface of the photoimageable composition layer is applied to the surface of the printed circuit board. Using heat, vacuum and mechanical pressure, the dry film is laminated to the surface of the printed circuit board, partially conforming the photoimageable layer thereto. Within about 60 seconds and before substantial cooling of the printed circuit board and dry film has occurred, the cover sheet of the dry film is removed, whereupon the photoimageable composition layer and overlying top coat fully conform to the contours of the printed circuit board and substantially encapsulate the traces. The photoimageable composition layer is then exposed to patterned actinic radiation through the top coat. A developer is used to remove either exposed or non-exposed portions of the photoimageable composition layer, leaving the remaining portion of the layer laminated to the circuit board. Subsequently, the portions of the photoimageable composition layer remaining on the circuit board are cured, e.g., with heat and/or UV light.

In U.S. Pat. Nos. 4,946,524 granted Aug. 7, 1990 to Robert C. Stumpf et al., the disclosure of which patent, by reference, is incorporated herein, there is disclosed an applicator and process for applying dry film solder mask material to the surface of a printed circuit board allowing, at the same time, handling of the board with the applied film, the draw-off of the air enclosed between the film and the board, and the removal of the cover sheet. The draw-off of air enclosed between the dry film and the surface of the printed circuit board is facilitated when, before vacuum lamination, the surface of the board is covered with a loose sheet of film. To that end the applicator of U.S. Pat. No. 4,946,524 is operative to tack the dry film to a board at the leading and trailing edges with the intermediate portion of the film loosely applied thereto. The film is tacked to the board as a discrete cut sheet within the confines of the perimeter of the surface of the board. For convenience, a printed circuit board having such loose application of a dry film sheet to the surface or surfaces thereof is referred to as being "prelaminated."

In my U.S. Pat. No. 5,292,388 granted on Mar. 8, 1994 there is disclosed a method of and apparatus that is continuously automatically operative in an in-line system for applying under heat, vacuum and mechanical pressure a photoresist-forming layer to printed circuit boards that already have been prelaminated by the loose application thereto of dry film as discrete cut sheets within the confines of the surface of the boards whereby a laminate without entrapped air bubbles and closely conforming to the surface contours such as circuit traces of the printed circuit board is obtained. Featured is a two-part conveyorized vacuum applicator comprising as one part two input conveyors in end-to-end relation and as the other part a belt conveyor and vacuum laminator. The belt conveyor is characterized in its use of an endless belt having an aperture therein through which, in the vacuum laminating condition of the applicator, the movable lower platen of the vacuum laminator is movable upwards into sealing contact with the upper platen of the laminator, with the printed circuit board to be laminated and a portion of the upper run of the endless belt contained within the vacuum chamber of the laminator.

The results of the processes and apparatus described above have been most encouraging. Difficulty has been encountered, however, in adapting these processes and apparatus for continuous automatic operation in an in-line system. This is particularly true with respect to the utilization of an apparatus or machine in such an in-line process for automatic cover sheet removal from the laminated boards.

In addition to a need for improvement in the cover sheet removal process and apparatus, there is a need for improved separation between polyester and the photoresist, improved removal action to minimize the possibility of damage to the laminated board, and improved waste polyester treatment.

SUMMARY OF THE INVENTION

An object of the invention is to provide an improved method of and apparatus for the removal of the polyester cover sheets from dry-film laminated boards.

Another object of the invention is to provide an improved automatic apparatus having utility in the removal of the cover sheet of a dry-film from one or both sides of a laminated board simultaneously.

A further object of the invention is to provide such an automatic apparatus which is operative to effect facile and efficient removal of the cover sheet of a dry-film from one side, or both sides of a laminated board simultaneously, without causing damage to the board.

Another object of the invention is to provide a method of removing the cover sheet from a dry film laminated on a board comprising the steps of:
  (a) moving a knurling device relatively to the board along and in contact with an edge of the dry film while pressing on the knurling device,
  (b) at the same time blowing a first stream of air, in following relation to the knurling device, against the edge of the dry film to separate in this area a portion of the cover sheet from the dry film, and
  (c) conveying the board to a sucking roll which upon touching the surface of the board starts to rotate whereby the said cover sheet portion, already separated in an area thereof from the dry film, is sucked by the sucking roll and with continued rotation of the sucking roll the cover sheet is removed in its entirety from the dry film.

Still another object of the invention is to provide an improved apparatus for removing the cover sheet from a dry film laminated on a board, such apparatus comprising, in combination:
  a knurling wheel,
  a first air blowing injector,
  means for moving the knurling wheel, while pressing thereon, along the edge of said dry film, and at the same time actuating the first air blowing injector to blow a first stream of air in following relation to the knurling wheel against the edge of said dry film to separate in this area a portion of the cover sheet from the dry film, a sucking roll, and means for conveying the board to the sucking roll which upon touching the surface of the board starts to rotate whereby the cover sheet portion already separated in an area thereof from the dry film is sucked by the sucking roll and with continued rotation of the sucking roll the cover sheet is removed in its entirety from the dry film.

In accomplishing these and other objectives of the invention, there is provided an automatic polyester cover sheet removal apparatus that is characterized by the provision of a unique combination of a knurling wheel action and an air blowing injector means which cooperate in a single stroke to separate an edge of the cover sheet from the laminated board. Air blowing injectors located close to the knurling unit, one on either side thereof, are actuated by a programmable logic controller (PLC) one at a time. The air blowing injector which works during the stroke or travel of the knurling unit is the one "following" the knurling unit in the direction of travel.

The edge of the cover sheet separated, in the manner described, from the laminated board is now sucked by a sucking roll and conveyed by a system of driving belts to an expulsion system. A second air blowing injector (weaker than the air blowing injectors associated with the knurling unit) is arranged to help, that is, reinforce, the sucking action by pressing the separated portion of the cover sheet against the sucking roll.

When the cover sheet is completely out from the driving belts, it is in rolled up form in a tunnel of the expulsion system. Air circulating under pressure in this tunnel is supplied by the blower that is used for the air exhaust in the sucking rolls. The strength of this circulating air or "wind" is sufficient to force the rolled up cover sheet into a waste box, out of the sheet cover removal apparatus.

A check system located in the driving belts system recognizes if one or both cover sheets have not been removed from each of the successive boards. In such event the PLC operates to reject the board by a pneumatic system that is provided on an output driven roller.

The various features of novelty which characterize the invention are pointed out with particularity in the claims annexed to and forming a part of the specification. For a better understanding of the invention, its operating advantages and specific objects attained by its use, reference is made to the accompanying drawings and descriptive matter in which preferred embodiments of the invention are illustrated.

BRIEF DESCRIPTION OF THE DRAWINGS

With this description of the invention, a detailed description follows with reference being made to the accompanying figures of drawing which form part of the specification in which like parts are designated by the same reference numbers and of which.

DESCRIPTION OF THE PREFERRED EMBODIMENT

Figure 1:
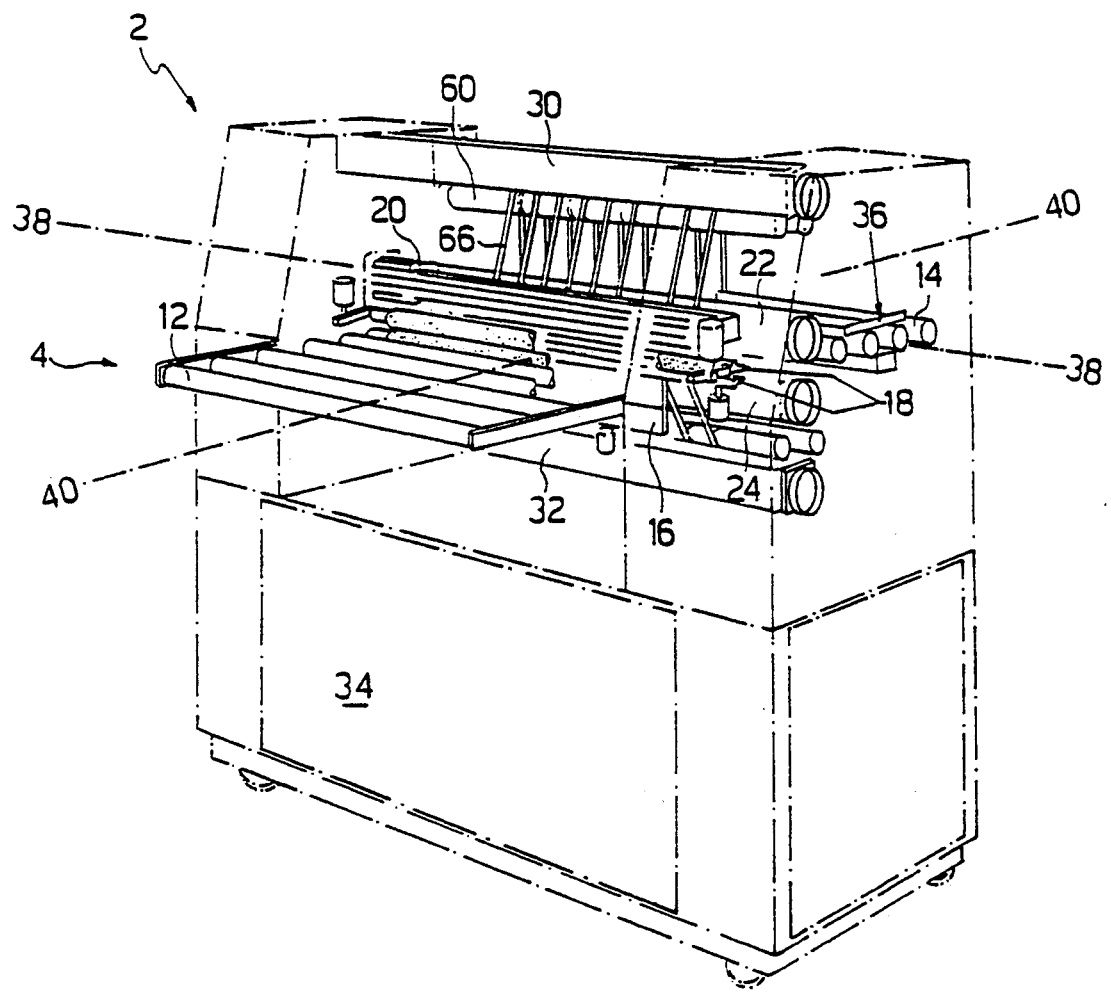
FIG. 1 is a perspective view of the apparatus, according to the invention, for cover sheet removal from laminated boards.
Figures 2, 2A:
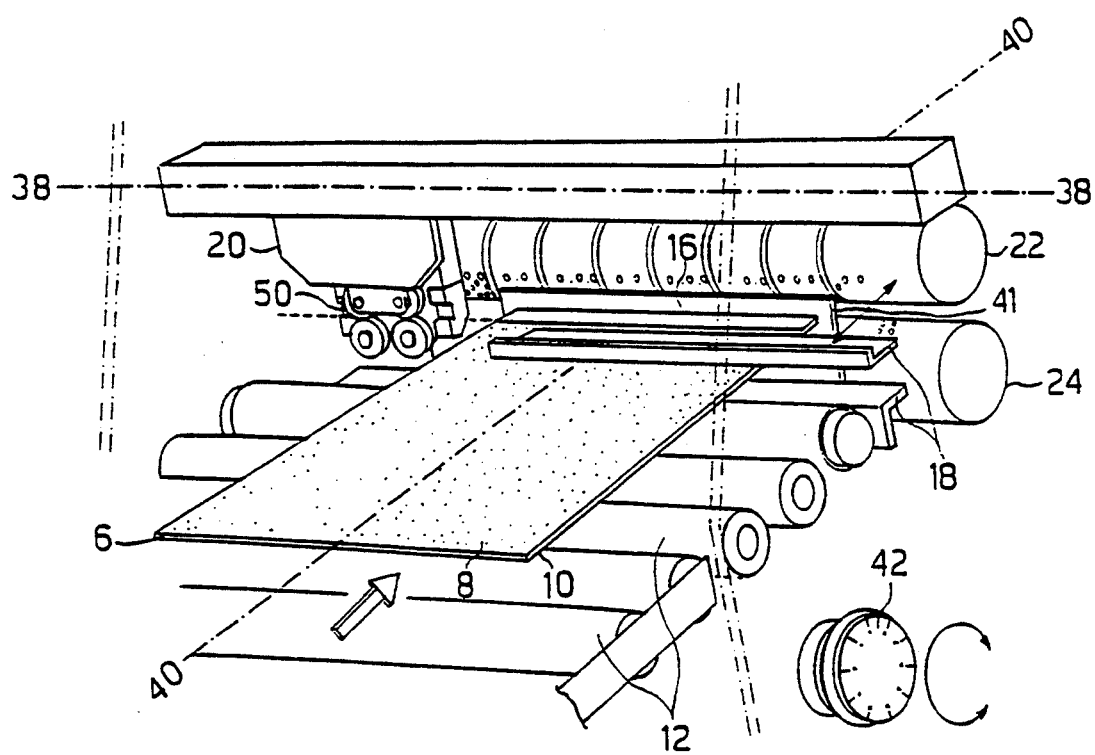
FIG. 2. is a fragmented perspective view on a larger scale illustrating an input conveyor system for feeding laminated boards one at a time into the apparatus and aligning each of them, in turn, against a horizontal barrier.
FIG. 2A illustrates an adjustable nut for effecting vertical adjustment of the barrier in FIG. 2.
Figure 3:
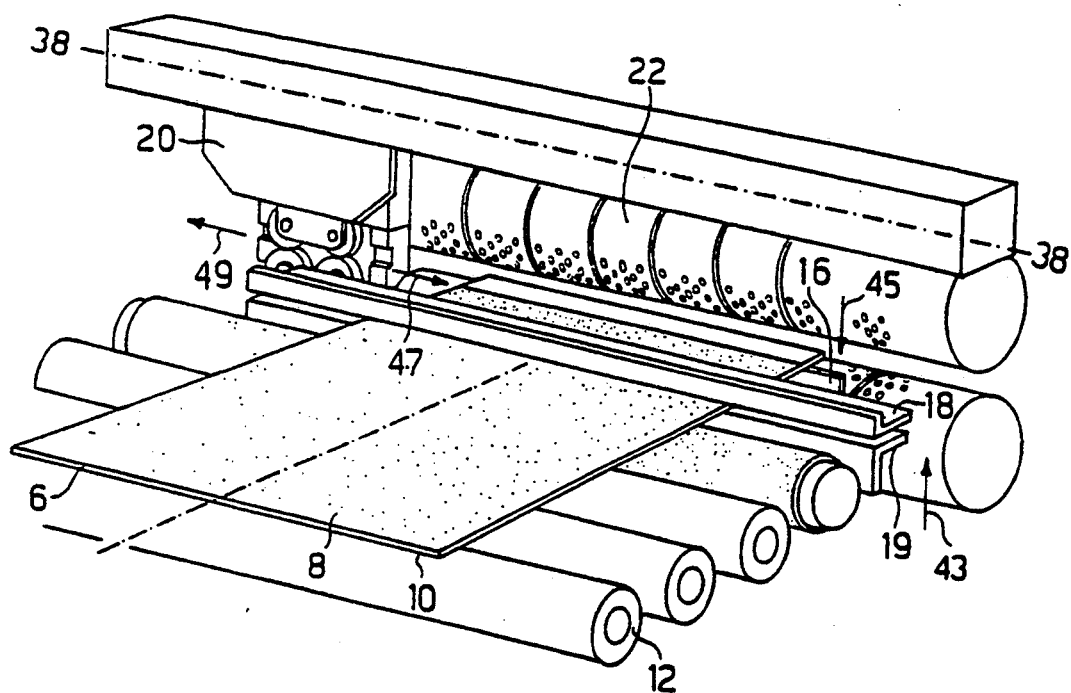
FIG. 3 is a perspective view illustrating a gripping system for the laminated boards and a knurling unit that is driven by a pneumatic cylinder from one side of the apparatus to the other on the horizontal axis of the apparatus.

Referring to the drawings, the apparatus or more precisely, machine, for effecting the automatic removal of cover sheets from laminated boards, according to the invention, is designated by the reference numeral 2. The apparatus 2, as shown in FIGS. 1-3, includes a conveyor means 4 for moving each of a succession of laminated boards 6, from the top and bottom surfaces respectively associated cover sheets 8 and 10 are to be removed, one by one toward and away from the apparatus 2. The conveyor means 4 comprises input driven rollers 12 that are located on the entrance or input side of the apparatus 2 and output driven rollers 14 that are located on the exit or output side thereof.

Since the laminated boards 6 are normally laminated with dry film on both sides with each of such dry films having a cover thereon requiring removal, the apparatus 2 is constructed symmetrically with respect to the axis of conveyance of the conveyor means 4. For the sake of brevity of illustration, the description herein is largely confined to the upper half portion of the structure of the apparatus 2, as shown in the drawings, although specific reference is also made sometimes to the lower half portion.

The apparatus 2 further includes an elongated settable front edge register 16 (referred to hereinafter as a "barrier"), and a board gripping system 18. Additionally, the apparatus 2 includes a knurling device or unit 20, a pair of elongated sucking or suction rollers 22 and 24, a pair of driving belt systems 26 and 28, a pair of expulsion systems 30 and 32, and a base frame 34 containing an electrical cabinet and actuators including an air exhaust unit or blower described hereinafter.

Figure 11:
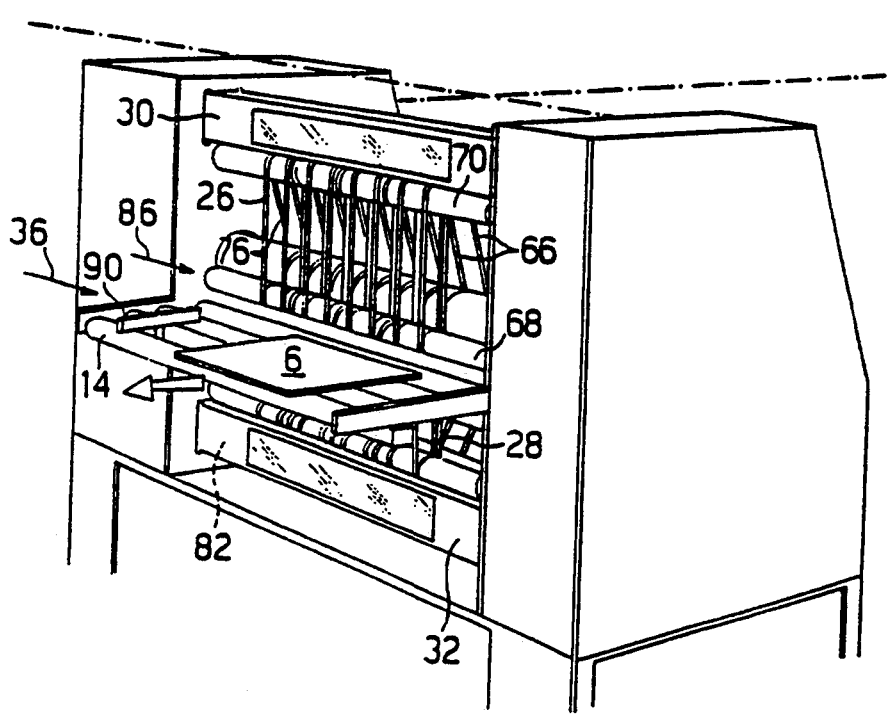
FIG. 11 is a perspective view of the cover sheet removal apparatus as seen from the rear or back side thereof.

As illustrated in FIG. 11, the apparatus 2 further includes a laminated board rejection system 36. The rejection system 36 is situated in cooperative relation with the output driven rollers 14, operating transversely of the latter to reject boards from which the cover sheets have not been removed. In FIG. 11 the belt systems 26 and 28 and the expulsion systems 30 and 32 are shown in further detail with a laminated board 6, from which the cover sheets, that is, a top sheet 8 and a bottom sheet 10, had been removed, exiting the apparatus 2 on the output driven rollers 14.

In the operation of the apparatus 2, as shown in FIG. 2, a laminated board 6, from the top and bottom surfaces of which cover sheets 8 and 10, respectively, are to be removed, is conveyed into the apparatus 2 by the input driven rollers 12 at an adjustable speed of, for example, 1-3 meters per minute (mt/min). In one embodiment of the invention, the dimensions of the laminated board 6 should be within a range of 0.1-5 mm thick and 200×200 mm-650×650 mm length and width.

The laminated board 6 is moved into engagement with and stopped at the barrier 16. Due, however, to continued rotation of the input driven rollers 14, the leading edge of the board 6 is moved into alignment with the horizontal axis, indicated at 38—38, of the apparatus 2. The vertical axis of the apparatus 2, indicated at 40—40, is positioned substantially perpendicularly to the horizontal axis 38—38.

The barrier 16 is manually adjustable vertically on the vertical axis 40—40, as indicated by the arrow 41 in FIG. 2, by a nut 42 shown in FIG. 2A for a maximum travel of 10 mm in one (1) mm steps. The purpose of providing the vertical adjustment of the barrier 16 is to allow the laminated board 6 to stop with the front or leading edge of the dry film thereon in position with or adjacent to the wheels 50 of the knurling unit 20. The dry film can be laminated on the board starting from the beginning of the leading edge of the board (front edge—0 mm) or spaced from that edge to a maximum of 10 mm (front edge—10 mm).

After being aligned with the horizontal axis 38—38 of the apparatus 2, the laminated board 6 is gripped by upper movement of member 19 of the board gripping system 18, as indicated by the arrow 43, and held in the aligned position. Thereupon the barrier 16 is actuated downwardly as seen in FIG. 3 and indicated by the arrow 45 and thereby creating or clearing a space or path through which the knurling unit 20 can be moved across the board 6 transversely thereof and of the apparatus 2. The knurling unit 20 is then driven by an actuator, for example, a pneumatic cylinder means ( not shown ), and caused to travel, as indicated by the arrow 47, from one side of the apparatus 2 to the other, on the horizontal axis 38—38. Movement of the knurling unit 20 in the other direction is indicated by the arrow 49. During the travel thereof in either direction the knurling unit 20 engages, that is, touches under suitable pressure both sides (upper and lower) of the leading edge of the board 6 on the first 2-3 mm thereof, making on each side thereof an elongated etching which separates the respectively associated leading edge of the cover sheets 8 and 10 from the upper and lower surfaces, respectively, of the board 6.

Figure 4:
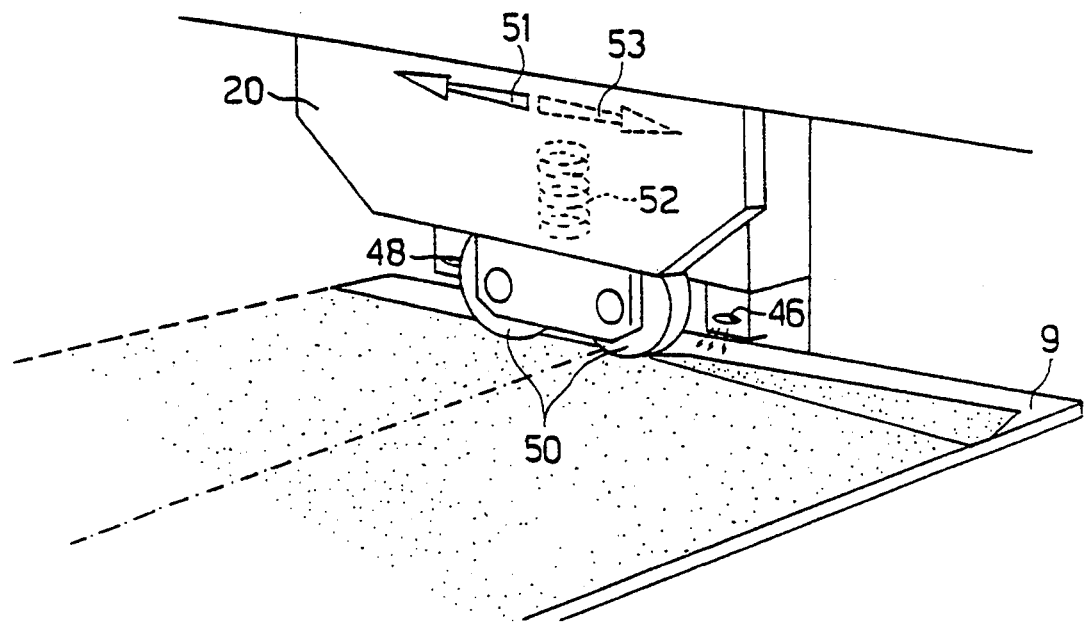
FIG. 4 is a view illustrating the knurling unit and air blowing injectors which cooperate therewith to separate an inner or leading edge of the polyester cover sheet of a laminated board from the photoimageable layer thereon.

At the same time, as illustrated in FIG. 4, an air blowing injector 46 that is located close to and in following relation to knurling wheels 50 of the knurling wheel 20 is operative, definitively, by means of blowing a first stream of air thereagainst to pull up the leading edge 9 of the cover sheet 8 from the upper surface of the board 6 in the first 20-30 mm thereof. In the execution of this operation the action of the knurling wheels 50 and of the air blowing injector 46 work together in a single stroke transversely of the board 6.

The wheels 50 of the knurling unit 20 are pressed against the laminated board 6 by a spring 52. Thus, adjustment of the pressure of the wheels 50 is not necessary to compensate for variations in the thickness of the boards 6 from which the cover sheet 8 and 10 are removed.

Figures 5, 6:
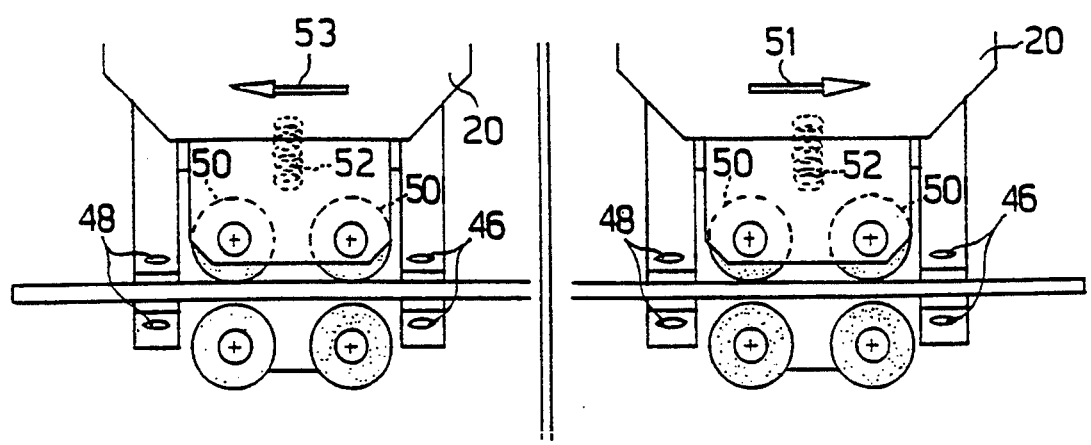
FIG. 5 and 6 show that the air blowing injector which works during the knurling travel is that which follows the wheels of the knurling unit in the travel direction.

The air blowing injector 46, as shown in FIG. 4 and also in FIGS. 5 and 6, is located on the knurling unit 20 above the board 6, on one side of the knurling wheels 50. A similar air blowing injector 48 is located close to the knurling unit 20, also above the board 6, on the other side thereof. The air blowing injectors 46 and 48 are activated by a PLC (not shown) one at a time depending upon the direction of travel of the knurling unit 20. The air blowing injector 46 or 48 which works, that is, is activated, during the travel of the knurling unit 20 is that which "follows" the wheels 50 in the travel direction, as indicated by the arrows 51 and 53 in FIGS. 5 and 6.

Air blowing injectors similar to the air blowing injectors 46 and 48 are provided, as shown in FIGS. 5 and 6, on the knurling unit 20 below the board 6 and are similarly controlled by the PLC.

Figure 7:
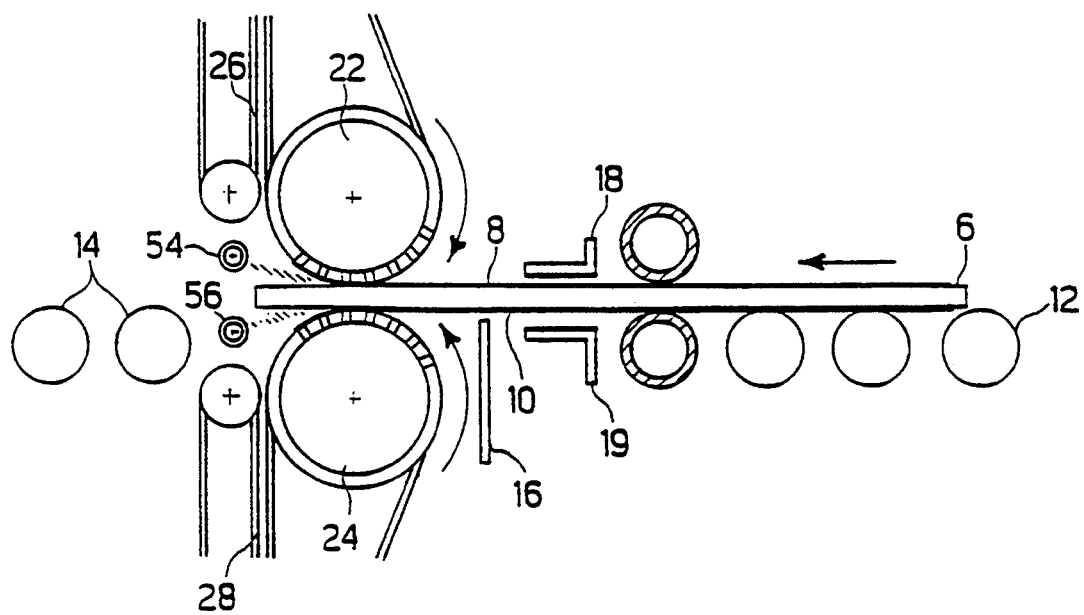
FIG. 7 and 8 show how the cover sheet of the laminated board, already separated in the leading edge thereof from the board, is sucked by sucking rolls and conveyed to a driving belts system.
Figure 8:
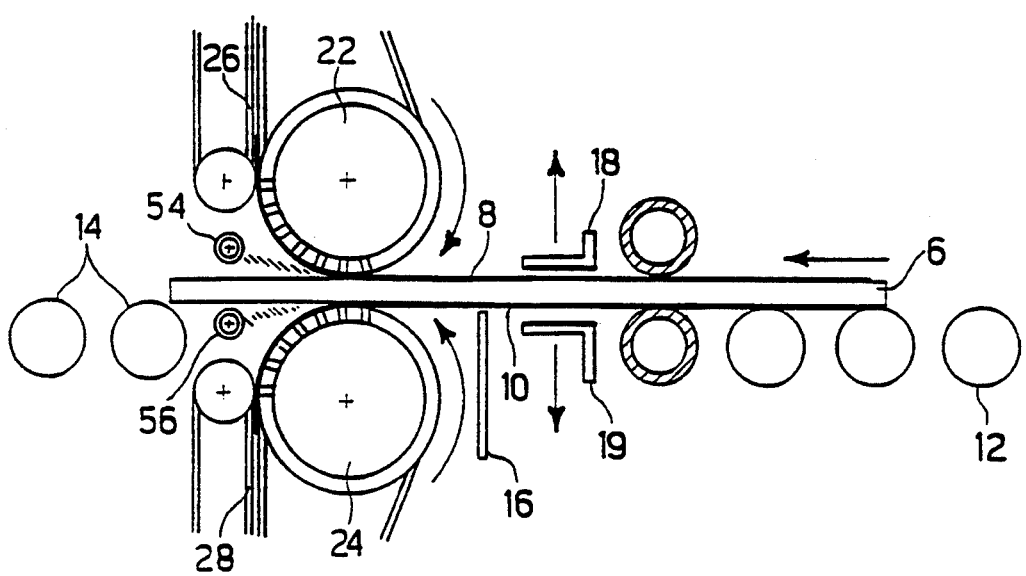

As shown in FIG. 7 and 8, after etching and separation of the leading edges of the cover sheets 8 and 10 has been effected by the described knurling and air blowing injector action, the laminated board 6 is released by the board gripping system 18 and driven by the input driven rollers 12 to the sucking rollers 22 and 24. Upon contact with the board 6, the sucking rolls 22 and 24 start to rotate in touch with it.

The leading edges of the cover sheets 8 and 10, already released in the first 20-30 mm from the top and bottom surfaces, respectively, of the board 6, are now sucked and peeled from the respectively associated dry films by the sucking rolls 22 and 24, respectively, specifically by the holes therein, and conveyed to a respectively associated belts system 26 and 28. The belt system 26 and 28, in turn, convey the respective cover sheets 8 and 10 to an individually associated expulsion system 30 and 32. Second air blowing injectors 54 and 56 (which are weaker than the air blowing injectors 46 and 48) located behind the sucking rolls 22 and 24, respectively, help the sucking action by pressing the released edge of each of the cover sheets 8 and 10 onto the respective sucking roll 22 and 24 associated therewith.

Figure 9:
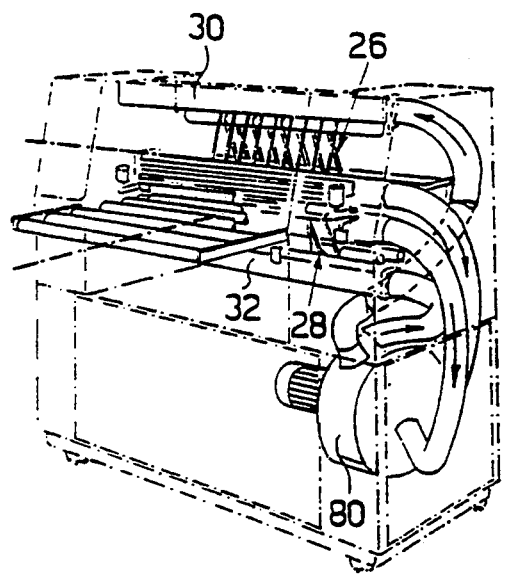
FIG. 9 is a perspective view of the apparatus, similar to FIG. 1 but on a smaller scale, illustrating the air blowing and exhaust system.
Figure 10:
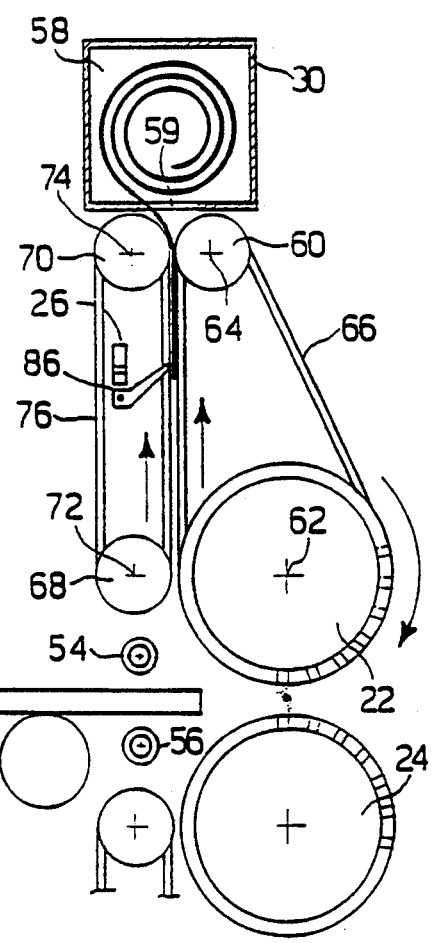
FIG. 10 is a fragmented cross sectional view taken on the lines 10—10 of FIG. 9 illustrating the driving belts system and the expulsion system for the waste polyester cover sheets.

The driving belt system 26 associated with the sucking roll 22 includes an elongated idler roll 60 having a smaller diameter and spaced upwardly from the axis 62 of the sucking roll 22 on an axis 64 parallel therewith, as best seen in FIGS. 9 and 10. A plurality of spaced endless bands or belts 66 of suitable flexible material in a suitably taut condition are wrapped around the sucking roll 22 and the idler roll 60.

In addition, the driving belt system 22 includes a pair of elongated spaced idler rolls 68 and 70 each of which has the same diameter as that of the idler roll 60 and the axes 72 and 74, respectively, of which are parallel to the axis 62 of the sucking roll 22 and the axis 64 of the idler roll 60, with the axes of the idler roll 60 and the sucking roll 22 and the axes of the idler rolls 68 and 70 each being parallel to the horizontal axis 38—38 of the apparatus 2. A plurality of spaced endless bands or belts 76 of suitable flexible material in a suitably taut condition are wrapped around the idler rolls 68 and 70.

The spacing of the axes 62 and 72 of the sucking roll 22 and the idler roll 68 and of the axes 64 and 74 of the idler rolls 60 and 70 is such, as best seen in FIG. 10, that adjacent runs 78 and 80 of the pluralities of belts 66 and 76 are parallel and sufficiently close, without touching, to receive and convey the separated cover sheet 8 from the sucking roll 22 to the expulsion system 30. The direction of rotation of the sucking roll 22 is such as to feed the separated sheet 8 between the pluralities of belts 66 and 76 and to cause the latter to deliver the separated sheet 8 to the expulsion system 30.

When completely out from the cover sheet driving belt system 26, the cover sheet 8 is situated in a tunnel 58 associated with the expulsion system 30, having been inserted therein through an elongated slot 59 in tunnel 58. Although not shown, the cover sheet 10 from the other side of the board 6 is similarly situated in a tunnel 82 associated with the expulsion system 32.

In the tunnel 58 of the expulsion system 30, and the tunnel 83, also, of the expulsion system 32, air is circulated under pressure from a blower 80, as shown in FIG. 9, which blower is used also for the air exhausted in the sucking rolls 22 and 24. Such circulating air or wind is under sufficient pressure that the cover sheets 8 and 10 are forced out of the respectively associated tunnels 58 and 82 into appropriate waste box means (not shown).

A check system 86 suitably located and mounted in the belts system 30, as shown in FIG. 10, recognizes, that is, senses whether or not the cover sheet 8 has been removed from the laminated board 6 and provides an appropriate electrical signal to a PLC (not shown. A similar check system (not shown) is provided in association with the belts system 28 for sensing if the cover sheet 10 has been removed.

Consequently, if one or both of the cover sheets 8 and 10 have not been removed, the PLC operates, as illustrated by the arrow 86 in FIG. 11, to reject such board 6 by actuating a pneumatic system indicated at 90.

Thus, in accordance with the invention, there has been provided an improved method of and apparatus for the automatic removal of a dry film from one or both sides of a laminated board simultaneously. The invention features a unique cover sheet removal technique that involves no touching by the human hand and causes no damage to the laminated boards from which the cover sheets are removed.

The cover sheet removal method and apparatus of the invention comprise an important component in the total arrangement of an automatic continuous flow of material in in-line processing of dry solder mask film and other films requiring vacuum lamination and cover sheet removal during processing.

The invention provides the means to automate the cover sheet removal process as an in-line system.

With this description of the invention in detail, those skilled in the art will appreciate that modifications may be made in the invention without departing from the spirit thereof. Therefore, it is not intended that the scope of the invention be limited to the specific embodiments illustrated and described. Rather, it is intended that the scope of the invention be determined by the scope of the appended claims.

What is claimed is:

1. A method of removing the cover sheet from a dry film laminated on a board comprising the steps of:

(a) moving a knurling device relatively to the board along and in contact with an edge of said dry film while pressing on said knurling device, (b) at the same time blowing a first stream of air, in following relation to said knurling device, against said edge of said dry film to separate in this area a portion of the cover sheet from the dry film, and (c) conveying the board to a sucking roll which upon touching the surface of the board starts to rotate whereby the said cover sheet portion, already separated in an area thereof from the dry film, is sucked and peeled from the dry film by the sucking roll and with continued rotation of the sucking roll is removed in its entirety from the dry film, wherein the dry film laminated board is rectangular in shape, wherein in step (a) the knurling device is in contact with an edge of said dry film in the first 2–3 mm thereof, wherein in step (b) blowing a stream of air in following relation to said knurling means, against said edge of said dry film in this area pulls up the cover sheet in the first 20–30 mm, and wherein in step (c) the sucking action of said sucking roll is reinforced by the injection of a second stream of air by pressing the separated portion of the cover sheet onto the sucking roll, said second steam of air being weaker than said first stream of air.

2. A method as defined by claim 1, including the further step:

(d) utilizing said sucking roll to convey the separated cover sheet to a cover sheet expulsion system.

3. A method of removing the cover sheet of a dry film that is laminated on a rectangular board having a leading edge with the leading edge of the dry film starting from the leading edge of the board or within a range of a few millimeters (mm) therefrom comprising the steps of:

(a) conveying the board in the direction of a first axis to cause the leading edge thereof to engage a barrier that is positioned in the path thereof on a second axis that is substantially perpendicular to the first axis, (b) aligning the leading edge of the board and the barrier, (c) gripping the board to hold it in position aligned with the barrier, (d) moving the barrier out of the path in which the board is being conveyed, (e) etching the leading edge of the dry film on the first few mm thereof by moving a knurling device in engagement with the dry film from one side of the board to the other on said second axis thereby separating in this area the cover sheet of said dry film from the board and at the same time injecting a first stream of air to pull up the separated cover sheet from the board in a larger area thereof, (f) releasing the board, (g) conveying the board to a sucking roll which upon touching the surface of the board starts to rotate whereby the cover sheet portion already separated in an area thereof from the board is sucked by the sucking roll, and (h) utilizing the sucking roll to convey the separated cover sheet to a belts system which conveys the separated cover sheet to an expulsion system, wherein in step (e) the knurling device is in engagement with the dry film on the first 2-3 mm thereof, wherein the injecting of a stream of air pulls up the separated cover sheet portion from the dry film on the board in the first 20-30 mm, and wherein between steps (g) and (h) there is provided the further step:

(i) reinforcing the sucking action by the injection of a second stream of air to press the separated cover sheet portion onto the sucking roll, said second stream of air being weaker than said first stream of ail.

4. A method of removing the cover sheet of a dry film that is laminated on a rectangular board having a leading edge with the leading edge of the dry film starting from the leading edge of the board or within a range of a few millimeters (mm) therefrom comprising the steps of:

(a) conveying the board in the direction of a first axis to cause the leading edge thereof to engage a barrier that is positioned in the path thereof on a second axis that is substantially perpendicular to the first axis, (b) aligning the leading edge of the board and the barrier, (c) gripping the board to hold it in position aligned with the barrier, (d) moving the barrier out of the path in which the board is being conveyed, (e) etching the leading edge of the dry film on the first few mm thereof by moving a knurling device in engagement with the dry film from one side of the board to the other on said second axis thereby separating in this area the cover sheet of said dry film from the board and at the same time injecting a first stream of air to pull up the separated cover sheet from the board in a larger area thereof, (f) releasing the board, (g) conveying the board to a sucking roll which upon touching the surface of the board starts to rotate whereby the cover sheet portion already separated in an area thereof from the board is sucked by the sucking roll, and (h) utilizing the sucking roll to convey the separated cover sheet to a belts system which conveys the separated cover sheet to an expulsion system, wherein in step (h) the belts system is driven by the sucking roll, and the expulsion system comprises a tunnel having an elongated slot therein through which the cover sheet is inserted and rolled up by the belts system, and from which tunnel the cover sheet is subsequently ejected by a circulation of air in the tunnel sufficient to blow the rolled up cover sheet therefrom and into a waste box.

5. A method as defined by claim 4 further including following step (h) the step:

(j) checking the belts system to determine whether the cover sheet has been removed, and if not, further including the step:

(k) rejecting the board.

6. A method of removing the cover sheets of dry film laminated to the opposed sides of a rectangular board having a leading edge with the dry film on each side of the board starting from such edge of within a range of a few millimeters (mm) thereof comprising the steps of:

(a) conveying the board in the direction of a first axis to cause the leading edge thereof to engage a barrier that is positioned in the path thereof on a second axis that is substantially perpendicular to the first axis, (b) aligning the leading edge of the board and the barrier, (c) gripping the board to hold it in position aligned with the barrier, (d) moving the barrier out of the path in which the board is being conveyed, (e) etching the leading edge of the cover sheet on each of the opposite sides of the board on the first few mm thereof by moving a separate knurling device in engagement with each of the cover sheets from one side of the board to the other on said second axis thereby separating in each such area the cover sheet from the board and at the same time injecting an individually associated first stream of air to pull up the separated cover sheet from each of the opposite sides of the board in a larger area thereof, (f) releasing the board, (g) conveying the board between the first and second sucking rolls each of which upon touching the individually associated surface of the board starts to rotate whereby each of the cover sheets already separated in an area thereof from the board is sucked by the associated sucking roll, and (h) utilizing each of the associated sucking rolls to convey the individually associated cover sheet to a belts system individual thereto which conveys the associated cover sheet to an expulsion system, wherein between steps (g) and (h) there is provided the further step:

(i) reinforcing the sucking action by each of the first and second sucking rolls by the injection of a second stream of air in association with each of the sucking rolls to press the associated cover sheet thereon, each of said second streams of air being weaker than each of said first streams of air.

7. A method of removing the cover sheets of dry film laminated to the opposed sides of a rectangular board having a leading edge with the dry film on each side of the board starting from such edge of within a range of a few millimeters (mm) thereof comprising the steps of:

(a) conveying the board in the direction of a first axis to cause the leading edge thereof to engage a barrier that is positioned in the path thereof on a second axis that is substantially perpendicular to the first axis, (b) aligning the leading edge of the board and the barrier, (c) gripping the board to hold it in position aligned with the barrier, (d) moving the barrier out of the path in which the board is being conveyed, (e) etching the leading edge of the cover sheet on each of the opposite sides of the board on the first few mm thereof by moving a separate knurling device in engagement with each of the cover sheets from one side of the board to the other on said second axis thereby separating in each such area the cover sheet from the board and at the same time injecting an individually associated first stream of air to pull up the separated cover sheet from each of the opposite sides of the bard in a larger area thereof, (f) releasing the board, (g) conveying the board between the first and second sucking rolls each of which upon touching the individually associated surface of the board starts to rotate whereby each of the cover sheets already separated in an area thereof from the board is sucked by the associated sucking roll, and (h) utilizing each of the associated sucking rolls to convey the individually associated cover sheet to a belts system individual thereto which conveys the associated cover sheet to an expulsion system, wherein in step (h) the belts system individual to each of the cover sheets is driven by the associated sucking roll, and the expulsion system comprises first and second tunnels having an elongated slot therein through which an associated cover sheet is inserted and rolled up by the belts system individual thereto, from each of which tunnels the cover sheet rolled up therein is subsequently ejected by a circulation of air therein sufficient to blow the cover sheet therefrom and into an associated waste box.

8. A method as defined by claim 7 further including following step (h) the step:

(j) checking each of the belts systems to determine whether the cover sheet has been removed from both sides of the board, and if not, further including the step:

(j) rejecting the board.

9. For removing the cover sheet from a dry film laminated on a board, in combination:

a knurling wheel, a first air blowing injector, means for moving said knurling wheel, while pressing thereon, along the edge of said dry film, and at the same time actuating said first air blowing injector to blow a first stream of air in following relation to said knurling wheel against said edge of said dry film to separate in this area a portion of the cover sheet from said dry film, a sucking roll, and means for conveying the board to said sucking roll which upon touching the surface of the board starts to rotate whereby the said cover sheet portion already separated in an area thereof from said dry film is sucked by the sucking roll and with continued rotation of the sucking roll the cover sheet is removed in its entirety from the dry film, wherein said knurling wheel is in contact with an edge of said dry film in the first 2-3 mm thereof, and wherein blowing a first stream of air in following relation to said knurling wheel against said edge of said dry film in this area pulls said cover sheet in the first 20-30 mm, further including a second air blowing injector, wherein the sucking action of said sucking roll is reinforced by the injection of a second stream of air pressing the separated portion of the cover sheet onto the sucking roll, and wherein said second stream of air is weaker than said first stream of air.

10. The combination, as defined by claim 9, further including an expulsion system for the separated cover sheet, and means cooperating with and driven by said sucking roll for conveying the separated cover sheet to said expulsion system.

11. Apparatus for removing the cover sheet of a dry film that is laminated on a rectangular board, said board having a leading edge with the leading edge of the dry film starting from the leading edge of the board or within a range of a few millimeters therefrom, said apparatus having a first axis and a second axis disposed Substantially perpendicular to said first axis and having an entrance end and an exit end, comprising:

barrier means positioned along said second axis, said barrier means having a first end and a second end, knurling means positioned adjacent said first end of said barrier means and movable through a path to a position adjacent said second end thereof, air injection means, a sucking roll, a belts system, first conveying means for conveying said board at the entrance end of said apparatus in the direction of said first axis into contact with and stopping at said barrier means with said board positioned in a plane containing said second axis, said conveying means including means moving the leading edge of the board into alignment with said barrier means and the leading edge of the dry film in position with said knurling means, means operative upon alignment of the leading end of the board with said barrier means to grip said board and hold it against movement by said conveying means in the aligned position, means operative when said board is held in the aligned position to move said barrier means out of the path through which said knurling means is movable, means moving said knurling means in pressure contact with the leading edge of the dry film from one side of said board to the other to etch and thereby separate in this area of the dry film the cover sheet therefrom, means operative in following relation with said knurling means to inject a first stream of air against the separated cover sheet to pull up the cover sheet in a larger area thereof, means releasing said board for movement by said first conveying means whereupon said conveying means conveys said board to said sucking roll means which upon touching the surface of the board starts to rotate and the cover sheet of said dry film already separated in an area from the board is sucked by the sucking roll and conveyed thereby to said belts system, and an expulsion system to which said separated cover sheet is conveyed by said belts system for disposing of said separated sheet, wherein said knurling means comprises at least one rotatable wheel that is in pressure contact with the dry film on the first 2-3 mm thereof, wherein the injection of a stream of air pulls up the cover sheet from the dry film on the board in the first 20-30 mm, and further including means to reinforce the sucking action by said sucking roll means by injecting a second stream of air to press the separated cover sheet onto said sucking roll means, the strength of said second stream of air being weaker than the strength of said first stream of air.

12. Apparatus as defined by claim 11 wherein the belts system is driven by said sucking roll means and said expulsion system comprises a tunnel means having an elongated slot therein through which the cover sheet is inserted into said tunnel means and rolled up therein by said belts system, and further includes means to produce a circulation of air therein of strength sufficient to blow the rolled up cover sheet out of the tunnel for handling as waste.

13. Apparatus as defined by claim 12 further including, checking means for checking the belts system to determine whether the cover sheet has been removed from the dry film, further including second conveying means at the exit end of said apparatus, and further including rejection means provided at the exit end of said apparatus in cooperative relation with said second conveying means to reject said board if said checking means determines that the cover sheet has not been removed from the dry film thereon.

* * * * *